United States Patent Office 3,773,810
Patented Nov. 20, 1973

3,773,810
PROCESS FOR THE PREPARATION OF 2,3-DISUBSTITUTED 1,3-BUTADIENES
Daniel Bellus, Riehen, Switzerland, assignor to Ciba-Geigy Corporation, Ardsley, N.Y.
No Drawing. Filed July 28, 1971, Ser. No. 166,975
Claims priority, application Switzerland, Aug. 4, 1970, 11,717/70
Int. Cl. C07c *121/02*
U.S. Cl. 260—465.8 R          2 Claims

ABSTRACT OF THE DISCLOSURE

A new process for the preparation of 2,3-disubstituted 1,3-butadienes, such as CN—, COCl—, COOalkyl— and COOallyl—disubstituted 1,3-butadienes is disclosed which process comprises heating corresponding gaseous cyclobutenes to a temperature between 90° C. and 550° C., the 2,3-disubstituted 1,3-butadienes obtained thereby being useful intermediates for the preparation of polymers.

---

The present invention relates to an inventive process for the manufacture of partly new 2,3-disubstituted 1,3-butadienes and their use for the manufacture of polymers.

From the literature on the subject it is known that unsuccessful attempts have been made to manufacture 1,3-butadiene-2,3-dicarboxylic acids and their derivatives from the corresponding cyclobutadienes by means of electrocyclic reactions. As E. Vogel describes in "Liebigs Annalen," vol. 615, pages 18 and 19, the manufacture of 1,3-butadiene-2,3-dicarboxylic acid dimethyl ester by heating cyclobutene-2,3-dicarboxylic acid dimethyl ester to 160–170° C. is not successful. Instead of the expected compound, only polymers were obtained. Clearly, the manufacture of 1,3-butadiene-2,3-dicarboxylic acid derivatives by means electrocyclic reactions has hitherto been rendered abortive by these difficulties.

Surprisingly, a new process has now been discovered for manufacturing compounds of the formula

in which R represents —CN, —COCl, COOalkyl, preferably —COOalkyl containing 2 to 5 carbon atoms, such as carboxymethyl, carboxyethyl, carboxypropyl or carboxybutyl, or represents —COOallyl, by heating compounds of the formula

which process is characterised in that the heating takes place between 90° C. and 550° C., preferably in the range 330° C. to 430° C., in the gaseous state.

The invention relates also to the new compounds of the formula

in which R represents —COCl, —COOalkyl containing 2 to 5 carbon atoms, or represents —COOallyl.

In the process according to the invention, the gaseous compound of the Formula II is brought into a reaction zone, heated for a brief period of time and then cooled again. The length of the heating period is not critical for the process. Care must only be taken that the gaseous compound of the Formula II is maintained at elevated temperatures until the reaction is complete. A prolonged period of heating after the reaction is complete, however, reduces the yield of the compounds of the Formula I. The heating period may last several seconds, but advantageously 0.05 to 0.5 second. The yield in the process according to the invention is good. The starting product of the Formula II may be converted into the gaseous state in various ways. For example, it is possible to utilise the slight vapour pressure of the starting product at room temperature and to bring the latter into the reaction zone with the aid of an inert carrier gas. However, this process is uneconomic since, conditioned by the slight vapour pressure of the starting product, the conversion of the compound into the gaseous state, and consequently the reaction period, takes too long. The preferred embodiment of the invention consists in evaporating the starting compound of the Formula II in vacuo. Naturally, the reaction and the cooling of the reaction product are then carried out in vacuo too.

The process according to the invention can be carried out using apparatus with which the expert is familiar: for example, externally heated columns that are filled with glass spirals, porcelain saddles etc.

The starting compounds of the Formula II, in which R represents —COOalkyl or —COOallyl, are manufactured analogously to the method of W. H. Perkin and described in J. Chem. Soc., 1894, 950. The manufacture of the compounds of the Formula II, in which R represents —CN, is described in U.S. Pat. No. 3,275,676. The cyclobutene-1,2-dicarboxylic acid chloride is obtained by reacting cyclobutene-1,2-dicarboxylic acid with thionyl chloride. The cyclobutene-1,2-dicarboxylic acid is obtained in turn by saponification of the cyclobutene-1,2-dinitrile.

The compounds of the Formula I can be used for the manufacture of polymers in solution. Preferably, the polymerisation takes place at room temperature in dimethyl formamide, optionally with the addition of dioxan. The resulting polymers are particularly suitable for the manufacture of films (sheets) and the like.

The following examples illustrate the invention.

EXAMPLE I

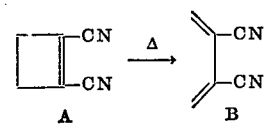

50 grams of the Compound A were distilled through a column for 150 minutes at 0.02 torr. The column was filled with cylindrical glass spirals (3 × 6 mm.) and heated to 375–385° C. White crystals (45.68 g.) collected in a cooled receiver. Upon dissolving the crystals in oxygen-free $CH_2Cl_2$, insoluble constituents of polymer character (0.48 g.) were filtered off. After adding hot n-hexane to the filtrate, white crystals (42.0 g.) formed. Yield: 88.5% of theory; melting point: 117° C. (with resinification).

By means of analytical data this substance was identified as 2,3-dicyano-butadiene-1,3 (B). IR (in KBr): i.a. 3.20; 3.30; 4.42; 5.18; 6.30; 7.13; 7.21; 8.58; 10.43; 11.33; 13.70μ  UV. (MeOH):$\lambda_{max.}$=226 nm. ($\epsilon$=16,850). NMR. ($CDCl_3$): $\tau$=3.64/d/J=7 Hz. MS.: (mass spectrum) m/e i.a. 104 ($M^+$), 77 ($M^+$—HCN), 52 ($M^+/2$).

*Elementary analysis.*—Calculated (percent): C, 69.28; H, 3.89; N, 26.91. Found (percent): C, 69.30; H, 4.07; N, 26.64.

EXAMPLE 2

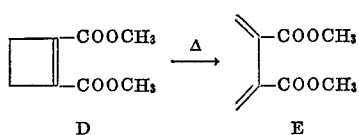

D → E 14.6 grams of the Compound D (M.P. 45° C.) were distilled through a column for 80 minutes at 0.05 to 0.07 torr. The column was filled with glass spirals (3 x 6 mm.) and heated to 380° C. In a cooled receiver a white oily substance (12.4 g.=85% of theory) collected, which according to NMR analysis contained more than 99% of 2,3 - dicarbomethoxybutadiene - 1,3 (E). Analyses: IR (liquid): i.a. 5.77; 6.14; 6.93; 7.50; 8.90μ UV. (CH$_3$OH): End absorption 215 nm. (ε=5,800). NMR. (CDCl$_3$): τ=3.70 and 4.15/2×"d"/"J" (apparent doublet) ca. 1.2 Hz., 2×=CH$_2$; 6.23/s, 2×CH$_3$. MS.: M$^+$=170.

*Elementary analysis.*—Calculated (percent): C, 56.47; H, 5.92; O, 37.61. Found (percent): C, 56.28; H, 6.00; O, 37.41.

EXAMPLE 3

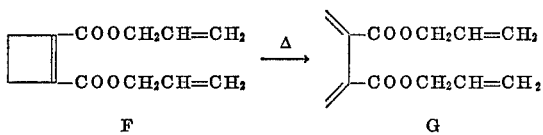

F → G 13.0 grams of the compound F (M.P. 98° C. to 104° C./0.12 torr; manufactured from cyclobutene-1,2-dicarboxylic acid chloride and allyl alcohol in the presence of triethylamine) were distilled through a column for 120 minutes at 0.06 to 0.07 torr. The column was filled with porcelain saddles (ca. 5 x 5 mm.) and heated to 380–390° C. In a cooled receiver a yellowish liquid (11.4 g.=87% of theory) collected, which according to NMR analysis contained more than 98% of 2,3-dicarballyloxybutadiene-1,3 (G.) Analyses: IR. (liquid): i.a. 5.72; 6.0; 6.11; 8.4; 8.9; 10.1; 10.7; 12.16μ UV. (CH$_3$OH): end absorption. 218 nm. (ε=2,520). NMR. (CDCl$_3$): τ=4.20+3.71/2×d/J=1.4 Hz., butadiene =CH$_2$; ca. 3.8–4.4/m, —CH=; ca. 4.5–5.0/m, allyl =CH$_2$; 5.38/d×t/J$_d$=5.5 Hz., —O—CH$_2$—. MS.: i.a. m/e 181 (M$^+$—CH$_2$CH=CH$_2$), 91 base peak).

*Elementary analysis.*—Calculated (percent): C, 64.85; H, 6.35; O, 28.79. Found (percent): C, 64.63; H, 6.24; O, 28.64.

EXAMPLE 4

8 grams of dimethyl formamide were diluted with 10 g. of dioxan, and to the resulting solution were added 3. g. of 2,3-dicyanobutadiene-1,3. After the reaction mixture had been stirred vigorously for a short time at room temperature it was freed from a few insoluble constituents by filtration.

The resulting filtrate was subsequently poured onto an aluminium sheet and stored at 60° C. Film formation occurred already after 1 hour.

The resulting film was clear, non-tacky at room temperature, soluble in dimethyl formamide and could neither be swelled nor dissolved in boiling acetone.

What we claim is:

1. A process for the manufacture of compounds of the formula

(I)

in which R represents —CN, —COCl, —COOalkyl or —COOallyl, by heating compounds of the formula

(II)

wherein the heating takes place between 90° C. and 550° C. in the gaseous state.

2. A process as claimed in claim 1, wherein the heating takes place in vacuo between 330° C. and 430° C.

References Cited

UNITED STATES PATENTS

| | | | |
|---|---|---|---|
| 2,870,196 | 1/1959 | Barney et al. | 260—485 |
| 3,275,676 | 9/1966 | Green et al. | 260—464 |
| 3,361,722 | 1/1968 | Prem et al. | 260—78.5 |
| 3,362,983 | 1/1968 | Sennewald et al. | 260—465.7 |

FOREIGN PATENTS

| | | |
|---|---|---|
| 561,645 | 5/1944 | Great Britain. |
| 907,821 | 10/1962 | Great Britain. |

OTHER REFERENCES

E. Vogel "Liebigs Annalen," vol. 615, pp. 18–19, 1958.
W. H. Perkin; Journal Chem. Soc., 1894, 950.

JOSEPH L. SCHOFER, Primary Examiner

J. KIGHT III, Assistant Examiner

U.S. Cl. X.R.

260—78.4 NE, 78.5 BB, B, 464, 465.1, 465.4, 465.7, 468 R, 485 R, N